No. 707,933. Patented Aug. 26, 1902.
M. F. KOCH.
PLAITING MACHINE.
(Application filed Apr. 17, 1902.)
(No Model.) 3 Sheets—Sheet 1.

WITNESSES:

INVENTOR
Millard F. Koch
BY
ATTORNEYS.

No. 707,933. Patented Aug. 26, 1902.
M. F. KOCH.
PLAITING MACHINE.
(Application filed Apr. 17, 1902.)
(No Model.) 3 Sheets—Sheet 2.

WITNESSES:

INVENTOR
Millard F. Koch
BY
ATTORNEYS.

No. 707,933. Patented Aug. 26, 1902.
M. F. KOCH.
PLAITING MACHINE.
(Application filed Apr. 17, 1902.)
(No Model.) 3 Sheets—Sheet 3.
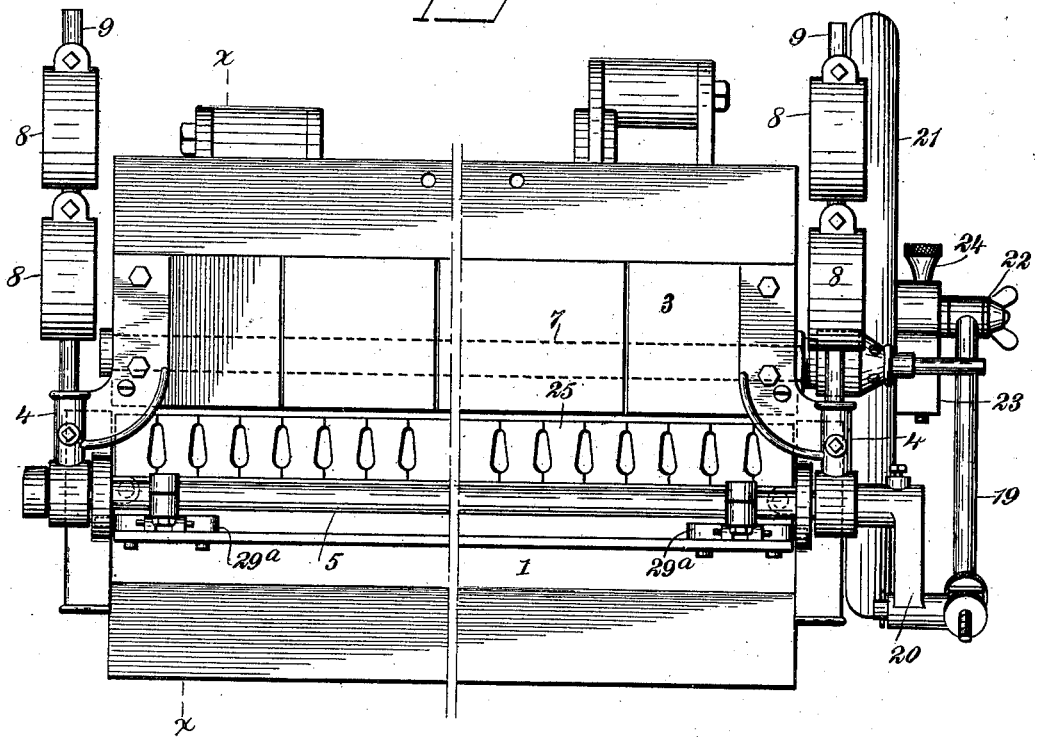
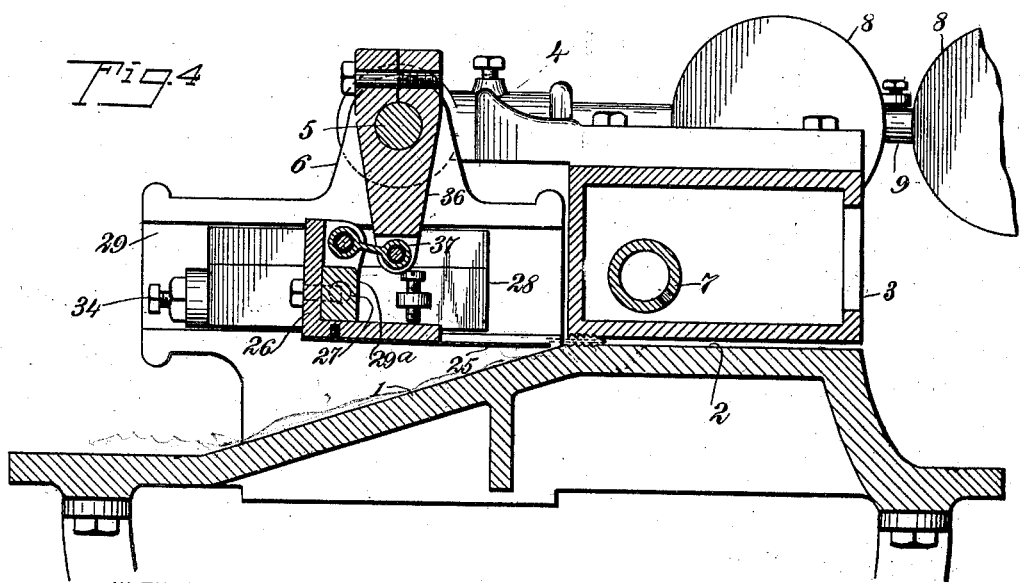
WITNESSES: INVENTOR
Millard F. Koch
BY
ATTORNEYS.

UNITED STATES PATENT OFFICE.

MILLARD F. KOCH, OF NEW YORK, N. Y.

PLAITING-MACHINE.

SPECIFICATION forming part of Letters Patent No. 707,933, dated August 26, 1902.

Application filed April 17, 1902. Serial No. 103,342. (No model.)

*To all whom it may concern:*

Be it known that I, MILLARD F. KOCH, a citizen of the United States, and a resident of the city of New York, borough of Manhattan, in the county and State of New York, have invented new and useful Improvements in Plaiting-Machines, of which the following is a full, clear, and exact description.

This invention relates to improvements in machines for accordion and side plaiting fabrics; and the object is to provide a machine by means of which the successive plaits may be rapidly and evenly formed and pressed.

I will describe a plaiting-machine embodying my invention, and then point out the novel features in the appended claims.

Reference is to be had to the accompanying drawings, forming a part of this specification, in which similar characters of reference indicate corresponding parts in all the figures.

Figure 1:
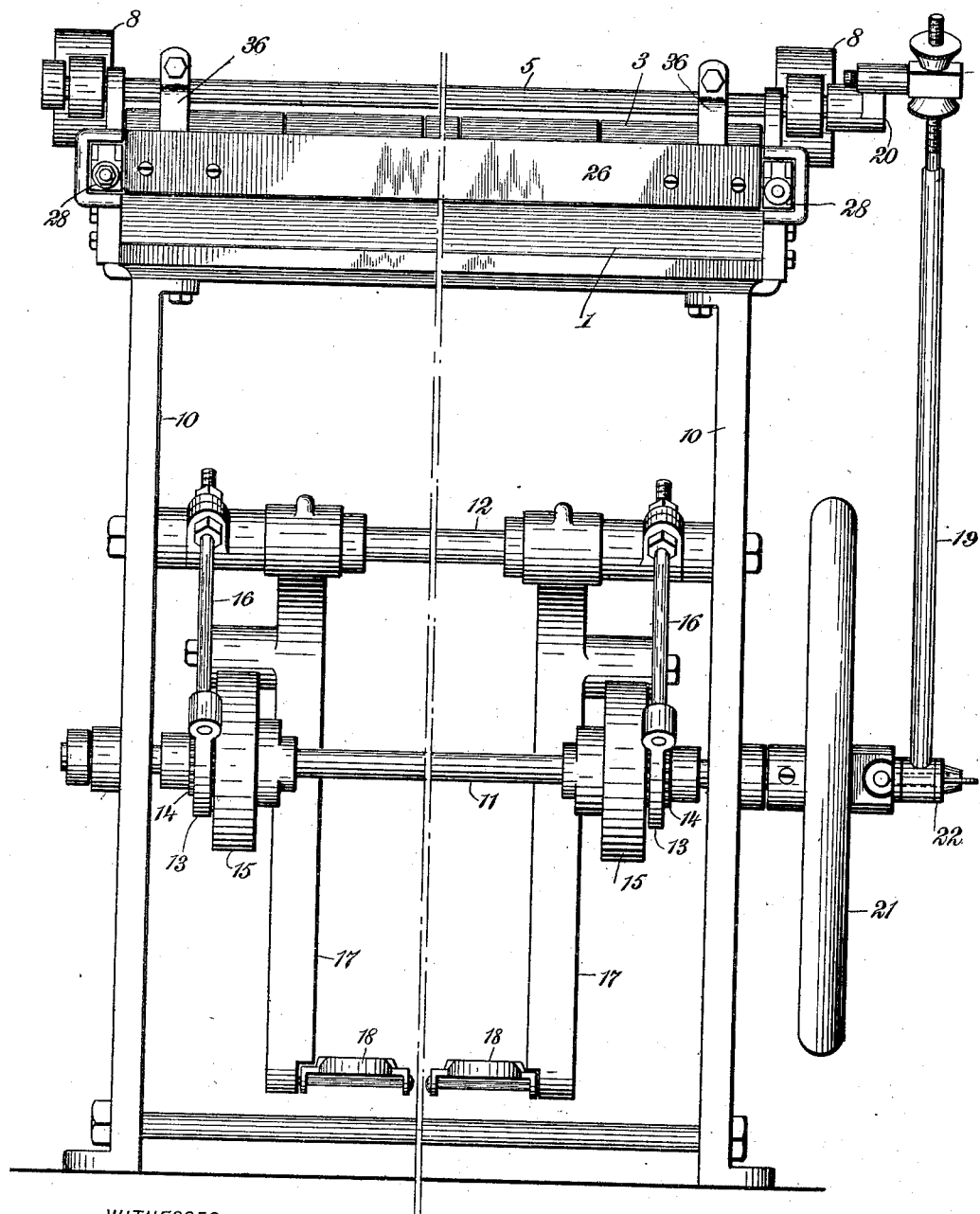
Figure 2:
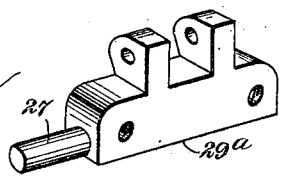
Figure 2:
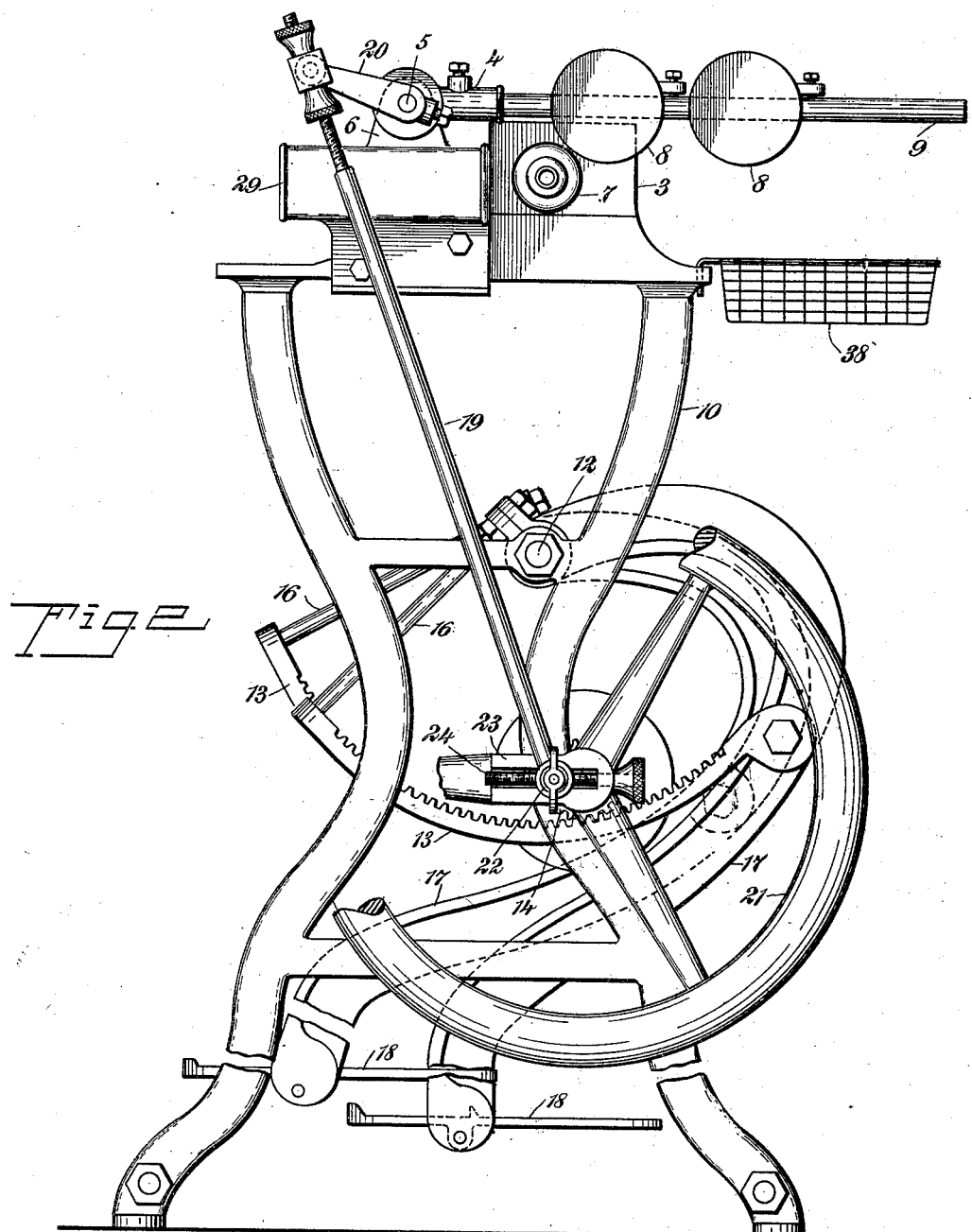
Figure 5:
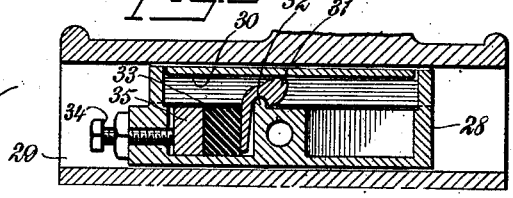

Figure 1 is a front elevation of a plaiting-machine embodying my invention. Fig. 2 is a side view thereof. Fig. 3 is a plan view. Fig. 4 is a section on the line $x\ x$ of Fig. 3. Fig. 5 is a sectional detail showing one of the sliding carriers employed. Fig. 6 shows in perspective one of the journal-blocks employed, and Fig. 7 illustrates the plaiting-blade movement.

The machine comprises an inclined bed-plate 1, at the rear end of which is a horizontally-disposed portion 2, over which a heating-box 3 is arranged. This heating-box is secured to arms 4, mounted to swing on a rock-shaft 5, having bearings in uprights 6 at the opposite sides of the bed-plate 1. The heating-box is provided with a tubular journal 7, and it is held yieldingly on the work by means of weights 8, mounted on rods 9, extended from the arms 4. As here shown, the heating-box is made in sections, so as to permit of expansion and contraction without buckling.

Having bearings in the frame or legs 10 is an operating-shaft 11, and above this shaft 11 is a rock-shaft 12. Segmental racks 13 are carried by the rock-shaft and engage with pinions 14 on the shaft 11. The pinions 14 are loosely mounted on the shaft 11, but are designed to rotate the same when engaged by clutches 15 on the shaft. These clutches permit of the alternate back-and-forth movements of the racks 13. As here shown, the racks 13 are connected at their front ends to the rock-shaft 12 by means of rods 16, while the rear ends are connected to the pedal-arms 17, these pedal-arms being attached to the rock-shaft and having pedal or foot plates 18 at the lower ends. A pitman 19 connects the crank-arm 20 on the end of the rock-shaft 5 with a wrist-pin on the fly-wheel 21, attached to the power or driving shaft. To permit of adjustments as to the throw of the rock-shaft 5, and consequently the throw of the plaiting-blade, as will be hereinafter described, the wrist-pin 22 for the pitman 19 is adjustable in a guide 23, attached to the outer side of the wheel 21, and the adjustments may be made by a screw 24 passing through an end wall of the guide and engaging in a tapped hole in the inner portion of the wrist-pin.

Arranged above the bed-plate 1 is the plaiting-blade 25. This plaiting-blade is connected to the lower horizontally-disposed portion of an L-shaped carrying-bar 26, on the ends of which are journals 27, having bearings in carriers or blocks 28, mounted to slide in guidways 29, formed in the side plates of the machine-frame. The blade 25 preferably consists of a number of independent sections adapted to yield independently one of the other. The object of this is to compensate or to provide for any one quality or thickness of cloth that may be operated upon—that is, while one section of the blade is moving over a thick section of cloth it may yield upward, while the other sections will be carried forward on a slightly-lower plane or engage rather with the surface of the cloth. The journals 27 are formed on blocks $29^a$, attached, by means of screws, to the vertically-disposed portion of the carrying-bar 26. The carriers 28 are designed to move easily in their guideways; but to prevent any rattling thereof the upper wall of each carrier is made movable to bear against the upper wall of the guideways 29. This upper wall or plate is indicated at 30 in Fig. 5, and it is pressed upward by means of a cam 31, fulcrumed on a lug 32 and having a downwardly-extended tang portion engaging against a rubber cushion 33. The tension of this rubber cushion may be regulated by means of a screw 34 passing through an end wall of the carrier and engaging with a block 35, which bears against the rubber cushion. Depending arms 36 on the rock-shaft 5 have link connections 37 with the blocks 29ª.

In operation the goods are to be placed upon the inclined bed-plate 1. Then as the machine is put in motion the rock-shaft 5 will cause the plaiting-blade, which is bearing yieldingly on the fabric, to move forward, and this fabric will be carried in the form of a plait or tuck between the heating-box 3 and the bed-plate portion 2. After forming one plait the blade will be carried outward, swinging somewhat in the arc of a circle, clearing the cloth until it reaches its outermost position, when it will drop or move into engagement with the fabric again, and the forward motion for plaiting will be repeated. This motion of the blade is indicated in Fig. 7.

As before stated, the length of throw of the blade may be regulated by adjusting the pitman 19 either with relation to the wrist-pin 22 or with relation to the crank-arm 20, as it will be noted that a threaded portion of the pitman extends through a block on the crank-arm and is engaged by jam-nuts at opposite sides of the block. The material will be gradually forced outward, and a basket 38 may be conveniently arranged to receive it.

The movement of the blade in forcing the material under the heating-box will cause a slight rocking motion of the box, so that the finished material may readily pass underneath it.

Having thus described my invention, I claim as new and desire to secure by Letters Patent—

1. In a plaiting-machine, an inclined bed, a heating and pressing box, a rock-shaft, means for imparting motion to the rock-shaft, carrier-blocks mounted to slide on a horizontal plane in the machine-frame above the bed-plate, a blade-carrying bar mounted to swing in said carrier-blocks, a plate consisting of a plurality of sections attached to said bar, arms depending from the rock-shaft, and link connections between said arms and the said blade-carrying bar, substantially as specified.

2. In a plaiting-machine, an inclined bed-plate, a heating-box arranged to swing above the machine, carrier-blocks mounted to slide above the bed-plate, a blade-carrying bar having swinging connection with said carriers, a plaiting-blade attached to said bar, a rock-shaft, arms depending from said rock-shaft, link connections between the arms and said bar, and means for imparting motion to the rock-shaft, substantially as specified.

3. A plaiting-machine comprising an inclined bed-plate, carrier-blocks mounted to slide above said bed-plate, guides in which the blocks are movable, yielding walls for said carrier-blocks for engaging with walls of the guideways, a blade-carrying bar having swinging connection with said carrier-blocks, a rock-shaft, arms depending from said rock-shaft, link connections between the arms and said bar, and means for rocking the rock-shaft, substantially as specified.

4. A plaiting-machine comprising a bed-plate, a weighted heating-box mounted to swing over the bed-plate, carrier-blocks mounted to slide over the bed-plate, a blade-carrying bar having swinging connection with said carrier-blocks, a blade secured to the bar, a rock-shaft arranged above the bar, arms depending from said rock-shaft, link connections between said arms and said bar, a driving or power shaft, an adjustable wrist-pin carried by said driving or power shaft, a crank on the rock-shaft, and a pitman connection between said wrist-pin and said crank-arm, substantially as specified.

In testimony whereof I have signed my name to this specification in the presence of two subscribing witnesses.

MILLARD F. KOCH.

Witnesses:
  EDW. B. CORNELIUS,
  MONROE KOCH.